United States Patent
Denison-Pender et al.

(10) Patent No.: US 12,093,222 B2
(45) Date of Patent: Sep. 17, 2024

(54) DATA TAGGING AND SYNCHRONISATION SYSTEM

(71) Applicant: Prescient Healthcare Group Limited, London (GB)

(72) Inventors: Jamie Denison-Pender, Watlington (GB); Nicholas Denison-Pender, Glenfarg (GB); Rakesh Verma, Marlow (GB); Swati Kkatyal, New Delhi (IN); Tarun Ojha, Ghaziabad (IN)

(73) Assignee: Prescient Healthcare Group Limited, London (GB)

(*) Notice: Subject to any disclaimer, the term of this patent is extended or adjusted under 35 U.S.C. 154(b) by 49 days.

(21) Appl. No.: 17/455,044

(22) Filed: Nov. 16, 2021

(65) Prior Publication Data
US 2022/0156228 A1    May 19, 2022

(30) Foreign Application Priority Data

Nov. 16, 2020   (EP) ..................... 20207812
Nov. 15, 2021   (EP) ..................... 21208318

(51) Int. Cl.
G06F 17/00   (2019.01)
G06F 7/00    (2006.01)
G06F 16/178  (2019.01)
G06F 16/27   (2019.01)
G06N 20/00   (2019.01)

(52) U.S. Cl.
CPC .......... *G06F 16/178* (2019.01); *G06F 16/275* (2019.01); *G06N 20/00* (2019.01)

(58) Field of Classification Search
CPC ...... G06F 16/178; G06F 16/275; G06N 20/00
USPC ...................................... 707/611
See application file for complete search history.

(56) References Cited

U.S. PATENT DOCUMENTS

| | | | | |
|---|---|---|---|---|
| 5,956,721 | A * | 9/1999 | Douceur ............... | H04L 67/61 707/999.01 |
| 10,541,938 | B1 * | 1/2020 | Timmerman ......... | H04L 43/065 |
| 2008/0082352 | A1 * | 4/2008 | Schmidtler ........... | G06Q 10/10 705/2 |
| 2008/0086433 | A1 * | 4/2008 | Schmidtler ........... | G06N 20/10 707/E17.09 |
| 2008/0306914 | A1 * | 12/2008 | Jensen ................... | G06F 16/38 707/999.003 |
| 2011/0035210 | A1 * | 2/2011 | Rosenfeld ............ | G06F 40/295 704/9 |
| 2012/0060216 | A1 * | 3/2012 | Chaudhri .............. | G06Q 10/10 726/21 |
| 2014/0071482 | A1 * | 3/2014 | Ishibashi ............. | H04N 1/2166 358/1.15 |

(Continued)

*Primary Examiner* — Pavan Mamillapalli

(57) ABSTRACT

A computer implemented method of synchronizing data between a central database and at least one individual database including the steps of: acquiring data from at least one external source; forming an intelligence dataset, wherein the intelligence dataset includes multiple intelligence datum; storing the intelligence dataset in a central database; applying a machine learning ML tagging algorithm to the stored dataset to assign at least one tag to each intelligence datum in the stored dataset, forming a tagged intelligence dataset including multiple tagged intelligence datum; and copying each tagged intelligence datum from the central database to at least one individual database based on the assigned tag.

20 Claims, 8 Drawing Sheets

(56) References Cited

U.S. PATENT DOCUMENTS

| | | | |
|---|---|---|---|
| 2014/0082003 A1* | 3/2014 | Feldman | G06F 16/3344 |
| | | | 707/755 |
| 2014/0337257 A1* | 11/2014 | Chatterjee | G06N 20/00 |
| | | | 706/12 |
| 2015/0142719 A1* | 5/2015 | Behuria | G06N 20/00 |
| | | | 707/610 |
| 2015/0294233 A1* | 10/2015 | Aultman | G06N 20/00 |
| | | | 706/12 |
| 2018/0122506 A1* | 5/2018 | Grantcharov | G16H 50/50 |
| 2019/0304604 A1* | 10/2019 | Kupersmith | G16H 50/20 |

* cited by examiner

Figure 1

DATA TAGGING AND SYNCHRONISATION SYSTEM

TECHNICAL FIELD

The present teaching relates to a system for automatically tagging data and synchronising the tagged data across a number of databases. The teaching has particular utility in providing a bio-medical artificial intelligent (BioMed-AI) framework capable of automatically extracting bio-medical tags for intelligent and secure synchronization of data across a number of databases.

BACKGROUND

Competitive intelligence is the systematic collection and analysis of large amounts of information from multiple sources. It involves defining, gathering, analyzing, and distributing intelligence about products, customers, competitors, and any other aspect of the external business environment that is needed to support executives and managers in strategic decision making for an organization. Competitive intelligence requires understanding and learning about what is happening in the world outside the business to increase a business's competitiveness, and so the business must learn as much as possible, as soon as possible, about their external environment including their industry in general and relevant competitors.

Thus, for competitive intelligence, a detailed understanding of big data is crucial in order to generate impactful insights that can be used to drive decision making in relation to product strategies and goals. One particular area of big data where a higher-order understanding is vital is the pharmaceutical industry, as the data insights aid decisions in relation to medical products, for example product trials and launches.

Making sense of big data, such as pharmaceutical data, collected from public sources can be very tedious considering the high volume of the data available and the challenges associated with establishing a correlation between two pieces of data.

Current systems for collecting and distributing large amounts of data to a number of end users for analysis generally use a data collection system in which data is obtained from a number of sources, for example scraped from websites, and entered into a central database. The central database is used to supply subsets of the collected data to a number of individual databases, each representing a different task or project for different end users. Since the data within each individual database relates to separate end users, the data cannot be shared between the individual databases and so data segregation is critical to preserve privacy and security of each end user's data. Dataflow from the central database to the individual databases is therefore one way and each individual database can only be accessed by an end user, or plurality of end users that have been assigned to that database and have been granted access to that individual database.

Segregating data presents many technical challenges at least in the field of electronic security. The one way nature of the dataflow from the central database should prevent malicious attempts to gain access to the central database, but this does not intrinsically guard against data processing errors that may occur, e.g. data being sent from the central database to the wrong individual database such that an unauthorised user accidentally gains access to it.

Particularly in the case of larger datasets, it is difficult to keep track of each item of data and also difficult to ensure that each item of data is copied only to location(s) in which it is authorised to be present. Manually checking the location(s) of each item of data in such scenarios is unfeasible given the time required to do so, such that an automated system for ensuring the security of each item of data is desirable. It will be appreciated that such an automated system must accurately determine allowed locations for each item of data in order to ensure data security.

It would therefore be advantageous to provide a system which can provide accurate, efficient, and secure segregation of data from a central database to a plurality of individual databases such that the likelihood of data processing errors resulting in data ending up in the wrong individual database is at least reduced.

SUMMARY

According to a first aspect there is provided a computer implemented method of synchronising data between a central database and at least one individual database comprising the steps of: acquiring data from at least one external source, forming an intelligence dataset, wherein the intelligence dataset comprises multiple intelligence datum; storing the intelligence dataset in a central database; applying a machine learning, ML, tagging algorithm to the stored dataset to assign at least one tag to each intelligence datum in the stored dataset, forming a tagged intelligence dataset comprising multiple tagged intelligence datum; and copying each tagged intelligence datum from the central database to at least one individual database based on the assigned tag.

The method, implemented by a computer system, therefore provides accurate data segregation of data from a central database to at least one individual database. The use of tags to assist in the copying of the intelligence data from the central database to the individual database results in more accurate copying in the sense that intelligence data is copied to the correct or relevant individual database, as determined by the tag. The security of the system may also be improved because the tagging prevents items of data from being copied to the wrong individual database. The tagging helps ensure that each item of data carries with it metadata that enables the set of databases in which it is authorised to reside to be immediately and unambiguously determined. The likelihood of copying errors is thus at least reduced. Further, the data can be marked with a unique identifier for the at least one individual database to which the data has been copied, which helps ensure that the data is not accessible through another database therefore protecting the contents of the individual databases.

The method of synchronising data between a central database and at least one individual database therefore uses tagging via machine learning to provide automated, secured synchronisation of segregated data between individual databases and a central database repository.

The method provides one-way data flow from a central database to at least one individual database, which may belong to a client. This means that no proprietary data is flowing back from one individual database to any other individual database, and so privacy of data is preserved between individual databases. Additionally, any changes made by an end user within an individual database are inaccessible, or hidden, from the other individual databases. In other words, updates of an individual database does not affect the data, and are not visible to, other individual databases.

Further, by copying each tagged intelligence datum from the central database to at least one individual database based on the assigned tag, data isolation is achieved by keeping separate individual databases.

The computer implemented method can be implemented in the context of a biomedical artificial intelligence (AI) framework ('Biomed-AI framework') for intelligently and automatically synchronizing data between a central database and one or more other databases based on tags extracted from the data being synchronized. The tags are bio-medical named entity tags.

The tagged data is automatically and intelligently pushed only to the database(s) which are relevant to the data being processed, based on the biomedical named entity tags extracted from the data using deep-learning-based machine learning (ML) models. The databases may relate to different projects and/or different clients.

Advantageously, the selective synchronization of data based on biomedical tags prevents inadvertent sending of data to unauthorized projects and clients, particularly computer systems operated by those projects and clients, thereby facilitating an automated security layer for the data synchronization framework. Here, 'unauthorized' is understood to mean a computer system and/or entity (e.g. project, client) that does not have the correct security privileges, access rights or other such permission-based authorisation techniques to access particular data.

The Biomed-AI framework uses ML models to intelligently extract biomedical tags from the data, which are then passed to a sophisticated database synchronization service which uses a combination of cloud-based storage, in-memory databases as well as relational databases, all coordinated by a set of microservices running on a cloud-based network. Together, the ML model and the synchronization framework intelligently perform the needed task of transferring data from the central database to the authorized databases.

The Biomed-AI framework provides one-way data flow from a central database to at least one other individual database which may belong to or is associated with a client. Here 'belong to' or 'associated with' is understood to mean that the particular entity (e.g. client) has administrative-type and/or owner-type rights and/or permissions in respect of the individual database(s). This one-way data flow ensures that no proprietary data flows back from the individual database to any other individual database, thereby preserving the privacy and security of individual databases. Furthermore, any changes made by an end user within an individual database are inaccessible, or hidden, from other individual databases. This ensure that updates of an individual database do not affect the data of, and are not visible to, other individual databases.

Additionally, by transferring data from the central database to individual database(s) based on biomedical tags extracted from the data by the ML model, data relevance is achieved by only copying the data to individual databases which are relevant to the identified tags.

In some examples, the acquiring step may comprise monitoring at least one external source for a change in source data and if a change is detected, acquiring the source data related to the change. This ensures that only new data is captured instead of re-capturing old data which has already been stored in the central database.

The monitoring may comprise checking for a change in source data based on information contained within a change alert. The change alert may be used to indicate what type of change is of interest. Since some changes to external sources may not necessarily include changes to content, the change alert provides an effective mechanism of ignoring changes which do not result in additional intelligence being created that needs to be acquired. For example, if a change in source data relates to a re-formatting of the source data, the change alert can be used to ignore this particular type of change as it has not result in new intelligence datum. As another example, if a change in source data relates to a deletion of content that was previously present or a change in the title of a document but no change in the main body of the document, the change alert may be used to ignore these types of change as either they have not resulted in new intelligence datum, or the new intelligence datum is not of interest.

In particular, the information contained with the change alert may comprise information related to the frequency of monitoring the external source and/or information related to a keyword to appear in the change in source data. Thus, in some examples, the change alert may be used to determine how often a source is monitored for changes. Since sources typically do to not change their content at a very high frequency rate, in order to give external viewers a chance to review the content, the external source does not need to be constantly monitored. This would be a computationally expensive and inefficient use of computing resource. Instead, by only monitoring the external source at predetermined times of the day, time intervals, and/or frequencies the computing resources can be used more efficiently and effectively.

Further, in some examples, the change alert may be used to indicate which keywords are of interest and should appear in any changes in source data. Since sources may change their content in a large variety of ways, not all these changes will be of interest and so not all changes need to be captured and acquired. Instead, by only monitoring the external source for changes based on predetermined keywords only changes that are of interest are captured, which additionally results in computing resources being used more efficiently and effectively.

Preferably, before applying the ML algorithm, the method may further comprise preparing the stored intelligence dataset in order to convert the stored intelligence dataset from raw source data to input data to be input into the ML algorithm. This helps ensure that the input data being fed into the ML algorithm is in a format which can be received and processed by the ML algorithm.

The preparing may comprise cleaning the raw source data to produce cleaned source data and converting the cleaned source data into numerical input data. The cleaning may comprise removing noise from the raw source data. This helps ensure that only relevant data is input into the ML algorithm. The ML algorithm requires numerical data as an input and so converting the source data into numerical data provides the ML algorithm with input data in a format that is easily consumed by the algorithm.

In some examples, the preparing comprises applying a term frequency-inverse document frequency TF-IDF algorithm to the stored intelligence dataset. This algorithm provides a convenient method of converting text into numeric vectors and so this TF-IDF algorithm provides a convenient and efficient method of preparing the stored intelligence dataset into input data to be input into the ML algorithm.

Preferably, the at least one tag corresponds to at least one individual database. As noted above the tags may be biomedical tags. In this case, based on the processing by the ML model, the biomedical tags are extracted from the data being processed. Tags which correspond to specific individual database(s) allow for selective copying of the data to such database(s).

Having a tag correspond to an individual database helps ensure that the associated intelligence datum to which the tag has been applied is copied to the correct individual database and only that database. Having a tag correspond to at least one individual database provides an effective method of ensuring that the tagged intelligence datum from the central database is copied to the at least one individual database. Errors in accidental transmission of data to the wrong individual database may also be reduced or eliminated entirely because the tag of each intelligence datum may be used to ascertain a set of allowed locations for that datum, providing a mechanism that enables an appropriate destination database to be identified in a manner that is independent from a copy instruction.

The applying step may comprise assigning a plurality of tags, e.g. biomedical tags, to each intelligence datum in the stored dataset. An intelligence datum will typically be relevant to more than one individual database and so assigning a plurality of tags to each intelligence datum ensures that each intelligence datum is sent to all the individual databases to which it is relevant, rather than only being sent to one individual database. The use of a plurality of tags being assigned to each intelligence datum provides an effective method of ensuring all the intelligence data is only copied to all the places where it is of interest and/or authorised to be present.

The plurality of tags may comprise a pre-defined set of tags, e.g. biomedical tags, to be assigned to the intelligence data. The tags may be pre-defined based on what is of interest to a particular individual user of a dataset, possibly in combination with what that user is authorised to access. The pre-determined tags may be changed or updated to include alternative and/or additional pre-determined tags. Having a pre-defined set of tags may improve the efficiency of the tagging process.

Preferably, the method further comprises ordering the plurality of tags assigned to each intelligence datum. The tags may be ordered based on a set of ordering criteria. Ordering the tags allows the relative position of a particular tag, compared to the other tags associated with the same piece of intelligence, to be considered prior to transfer of that intelligence from the central database to the individual database. For example, the order in which the tags are arranged or assigned to the intelligence may determine which intelligence is the most relevant and gets copied to the individual databases first.

In some examples, the ordering may comprise assigning a priority to each of the plurality of tags and ordering the plurality of tags based on the assigned priority. The priorities may be predetermined. The priorities of each tag may be updated and/or adjusted. The order in which the tagged intelligence datum are copied from the central database to the individual databases may be determined by the priority of the assigned tags associated with the intelligence datum.

The assigned priorities may comprise high priority tags, e.g. biomedical tags, and low priority tags, e.g. biomedical tags, and the ordering comprises ordering the tags from highest priority to lowest priority. The intelligence data may be copied to the individual databases starting with the intelligence data having the highest priority tags associated with it. A high priority tag may correspond to a most relevant intelligence datum and so this may have the effect that the most relevant tagged intelligence data is coped to the individual databases first. This provides an efficient copying mechanism which can help streamline the copying process, ensuring that the most important data is coped first. This can be particularly useful in the case of lower bandwidth channels and/or large volumes of data as the tag priority can ensure that a user has earlier access to more critical data.

According to another aspect there is provided a computer program comprising instructions which, when executed by a computer, cause the computer to carry out the method and any of its modifications.

According to another aspect there is provided a computer-readable data carrier having stored thereon the computer program as described above.

BRIEF DESCRIPTION OF DRAWINGS

Embodiments of the present teaching will now be described by way of example only with reference to the accompanying drawings in which:

FIG. 1 is a schematic flow diagram of a data tagging and synchronisation system;

DETAILED DESCRIPTION

Figure 2:
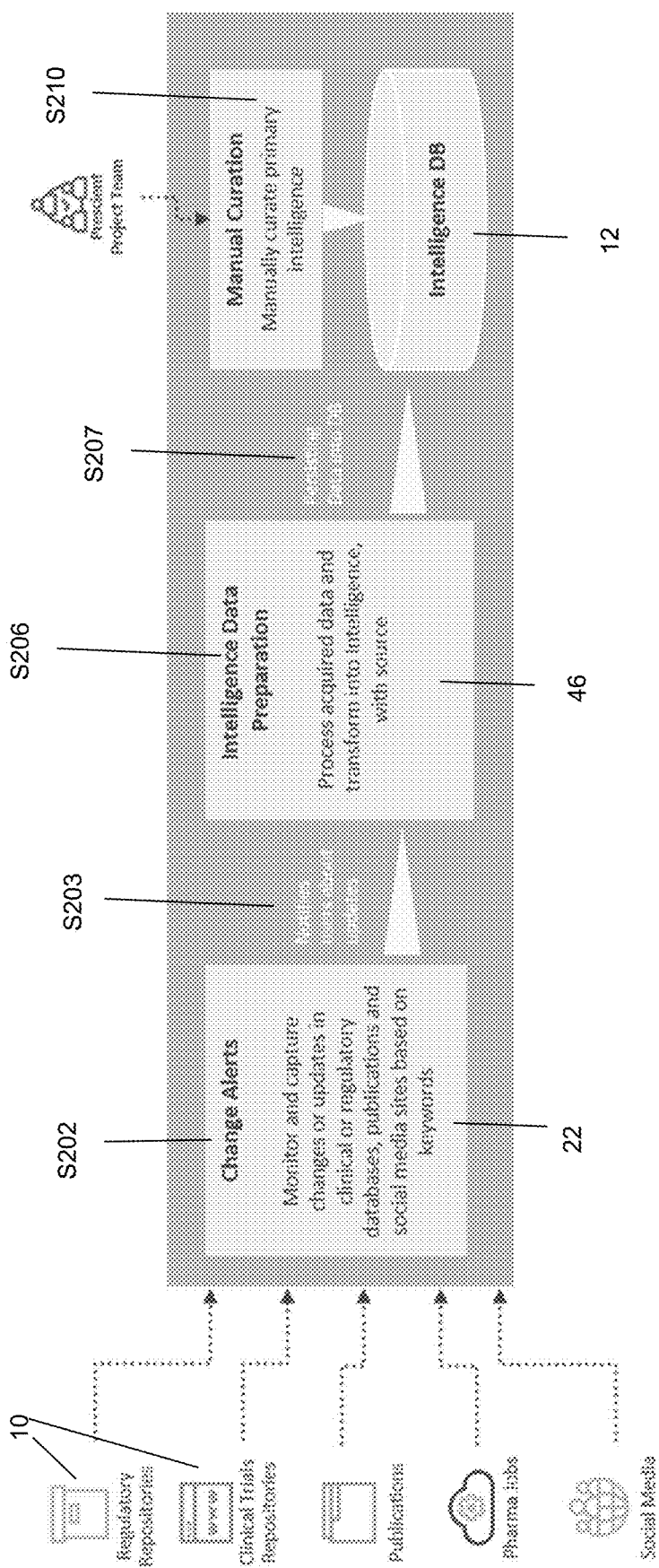
FIG. 2 is a schematic flow diagram of a data acquisition system.

For competitive intelligence a detailed understanding of large volumes of data within a particular field in necessary in order to drive decision-making based on insights generated through data analysis. As not all data within large data sets may be relevant to a particular decision or analysis, the data ideally needs to be sorted, or classified in some way, so that relevant data can be distinguished from non-relevant data.

The present teaching generally relates to an automated data segregation and synchronisation system which is able to segregate subsets of data from a dataset within a central database to a number of individual databases, and securely synchronise the individual databases with the central database only.

This is generally implemented through a tagging system to ensure that data from the central database is sent to the correct individual database. By correct, it is meant data that is relevant to a particular end user is sent to a database belonging to, or accessible to, that end user rather than to all end users. Additionally, the end user is authorised to access said data. The tag may be assigned to items of data based one or more of the following factors: the type of project to which the data relates, the end user, system requirements, and/or security considerations such as access restrictions connected with the data. The 'tags' discussed throughout this disclose can be 'biomedical tags'. In the specific case of biomedical tags, it is understood that data is only tagged (or labelled) using biomedically relevant labels.

Data within the central database is assigned a tag and the tag is used to control the copying of that data from the central database to the relevant individual database(s). Here, relevant has the same meaning as "correct", used previously. The tags can also be used to ensure full synchronisation between the data in all the individual databases with the central database. In this context data synchronisation is one-way in that data flow is only from the central database to the individual databases, in order to ensure the security of proprietary data.

Once data has been copied from the central database to an individual database, it becomes the property of the authorised user of that database. The data tagging and synchronisation processes are automated through the use of machine learning which provides a better (in particular a more efficient, more accurate, and more relevant) tagging and synchronisation system and therefore providing an improved data segregation system.

Automatic tagging of data is therefore a key part of the process of making sense of large data sets in order to generate insights and aid decision making, as well as helping to ensure the security of the data.

The tags assigned to the data are used to drive the flow of data and generated results and insights between a central storage (that is, the central database) and specific storage (that is, the individual databases). Since the tagged intelligence data is used to drive the insights, it is important to synchronise this tagged intelligence data with the relevant individual database(s). In order for this dataflow to operate efficiently and securely it is important that each piece of information or data is accurately tagged and preferably also sorted into an organised order to drive relevancy. That is to say, more relevant data can be pushed first, and so dataflow is ordered based on the relevancy to the end user.

The system described herein may take the form of a multi-user cloud-hosted application in which data segregation (which may also be referred to as data isolation) is achieved by storing data separately at a project level. That is to say, data relating to different projects is stored in separate individual databases. Some end users may have an interest in more than one project and so one user may have access to multiple individual project databases. High efficiency of the system application is achieved through data synchronisation between the central storage and specific storage in a relatively short time and with high relevancy.

In general, the central database comprises data collected using two main techniques. The first collection method is automatic data collection, which includes acquiring data from multiple sources using, for example, data scraping, RSS feeds, and API integration. Automatically acquired data preferably undergoes a clean-up and (re-)formatting process before it is entered into the central database, as will be discussed in more detail later. The second collection method is manual curation of data from sources in which individuals (for example researchers) curate data through user interfaces. In this case, the collected data is generally ready to be entered into the central database without modification. Both methods of data collection require the data to be tagged in accordance with the present teaching before it is synchronised with the end user's individual database(s).

Figure 4:
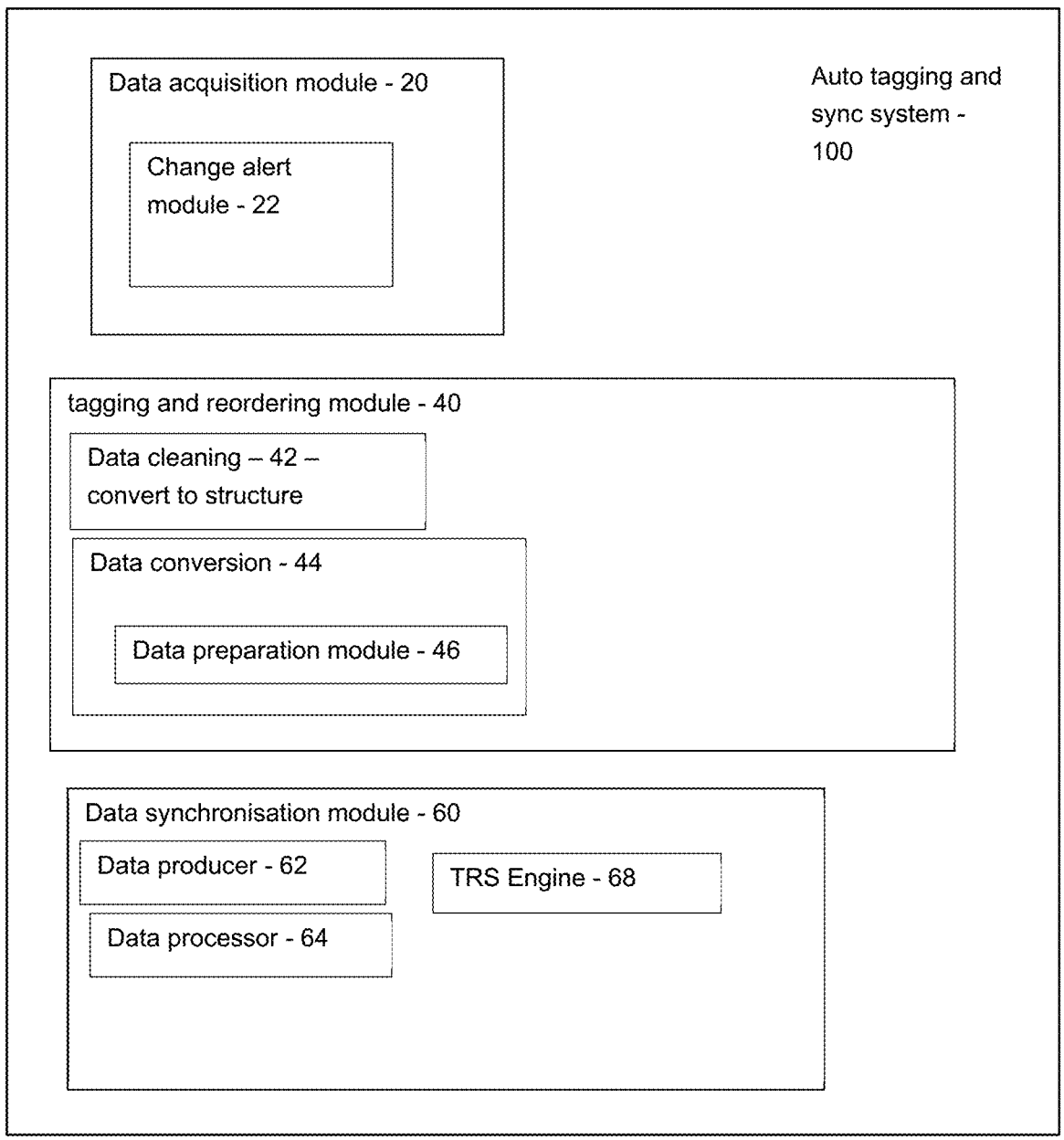
FIG. 4 is a block diagram of a tagging and synchronisation system.

As shown in FIG. 4, the data tagging and synchronisation system 100 described herein comprises three main components, namely an automatic data acquisition module 20, an automatic tagging and reordering module 40, and an automatic data synchronisation module 60. Each of these three components will be discussed in further detail below.

Considering first the automatic data acquisition module 20, useful data (which may also be referred to as intelligence) is typically a piece of data or information which has the ability to affect a decision or output of a process. For example, the intelligence could relate to a piece of news or a recent product trial. It is therefore important that each piece of intelligence be captured as close to possible to the time that it becomes available in order to be able to quickly analyse the effect that this new piece of intelligence has on current process and decisions, and how this may impact any future decisions. Since a particular end user is generally only interested in a subset of constantly generated intelligence that is relevant to their business or project, customized monitoring and tracking of intelligence generated from different public sources is required.

The automatic data acquisition module 20 is configured to carry out this monitoring and tracking of intelligence. In particular, the automatic data acquisition module 20 will monitor for any changes within a particular source (for example a new news article published on a news website, or a new academic paper published on an open-access repository) and capture the most recent yet still relevant piece of information. In some cases, the automatic data acquisition module 20 will monitor for any changes across a number of different sources. Each end user project will have specific requirements as to the type of information that is relevant to them and so the automatic data acquisition module 20 allows each end user to set-up specific monitoring and tracking criteria, and associated specific tasks such as alerts on how frequently intelligence data should be captured, on how to process any intelligence that has been identified as relevant, in order to capture only the data that is relevant to that particular project.

Captured data will typically be relevant to more than one project (in some cases an end user or client may have multiple projects), for example captured medical data could be relevant to several pharmaceutical companies or several medical trial projects. Multiple classifications or tags can therefore be associated with each piece of data. Machine Learning algorithm selection of tags for the data is useful in providing an accurate multi-label, which may also be referred to as multi-tagging, classification system. The machine learning algorithm which tags the data is implemented by the automatic data tagging and reordering module 40.

Figure 1:
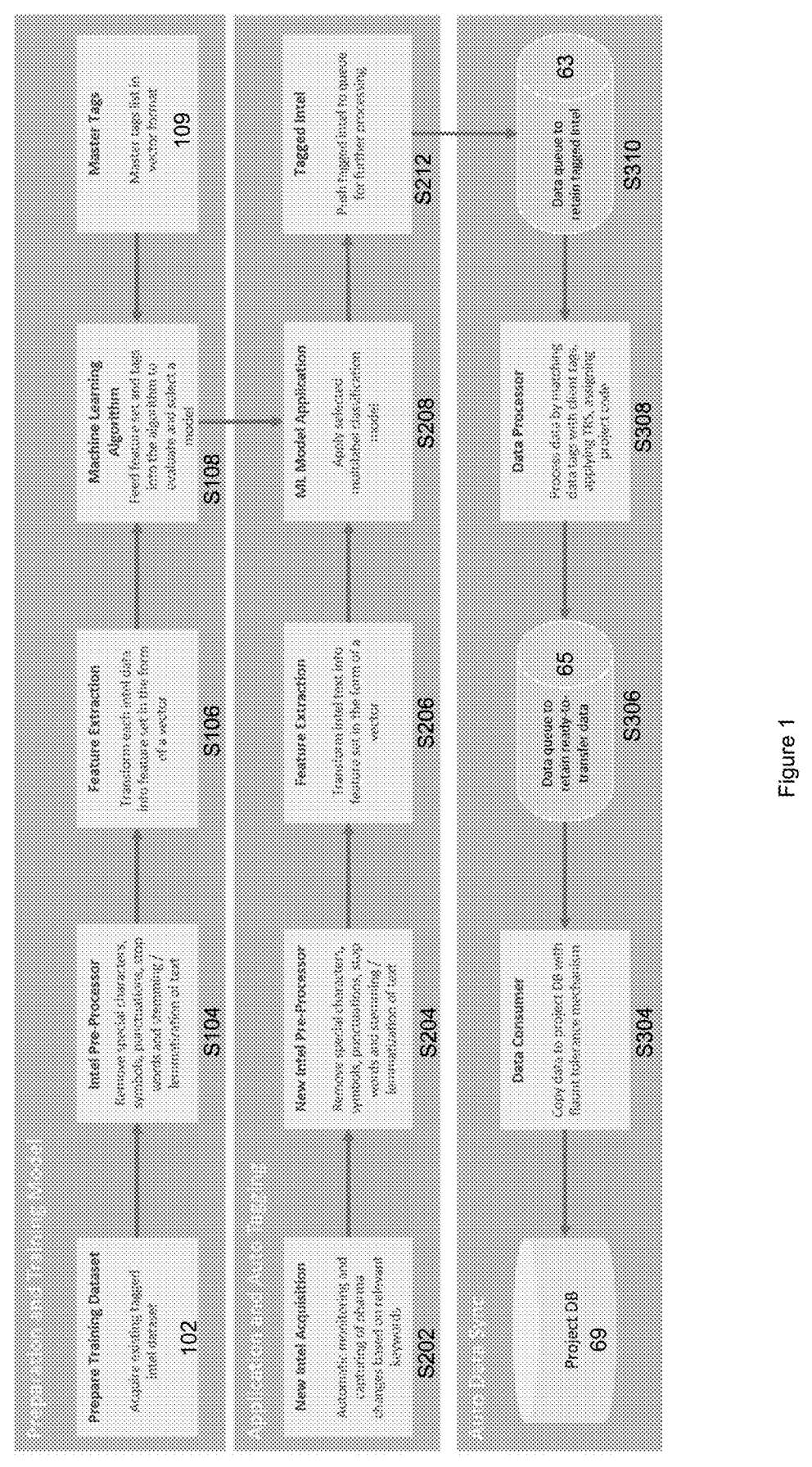

Before data is fed into the machine learning model, as shown in step S104 of FIG. 1, it is preferred that an operation is carried out to clean-up the data and prepare the data set (for example by re-formatting the captured data). Often, the data which is to be processed by the machine learning algorithm will contain useful data (for example in the form of a strings) and unwanted noise (for example HTML tags, extra spaces, non-alphabetical characters and "stop" words i.e., words that are not meaningful such as 'and', 'or' or 'the'). The automatic data tagging and reordering module 40 therefore comprises a data cleaning module 42 which carries out a data cleaning process on the acquired data to remove the unwanted noise and reduce the length of long strings (by removing the extra spaces, non-alphabetical characters and stop words, as described earlier)—see also S104 of FIG. 1. After the data has been cleaned it is converted into a numeric format for easy consumption by the machine learning algorithm (FIG. 1, S106). The conversion process is carried out by a data conversion module 44, which forms part of the automatic data tagging and reordering module 40. The process of converting the cleaned intelligence text into numeric vectors (FIG. 1, S106) preferably uses a Term Frequency-Inverse Document Frequency (TF-IDF) algorithm, which will be discussed in more detail later.

Not all machine learning algorithms have the in-built capability to handle multi-label data classification. There are many ML algorithms, also referred to as ML models, that are available to perform single classification. However, it is not practical or feasible (because it would be technically inefficient) to train one machine learning model for each tag because the intelligence data will be classified with multiple, and potentially diverse, keywords, meaning that the set of tags that can potentially be associated with each piece of intelligence tends to be quite large. In this context a tag is a single keyword, similar to a label, which can be associated with a piece of intelligence (for example "Sport" or "England").

There are some ML algorithms that have been specifically optimized for multi-label classification and it is important to evaluate and choose the right ML algorithm for this system which can perform multi-label classification efficiently. Machine learning algorithms that would be suitable, due to their in-built capability to handle multi-label data classification, include Random Forest, K-Nearest Neighbours (K-NN), and Neural Networks.

In order to determine which multi-label classification machine learning algorithm is most suitable an evaluation metric calculated. An evaluation metric comprising classification accuracy alone is not suitable because most tags will appear infrequently in intelligence data, which means that in general no tag will yield sufficiently high accuracy to satisfy the evaluation metric criteria. To address this, both the frequency of the tag and multiple tags are taken into account. The evaluation metric is calculated using the F1 Score, to indicate the algorithm's accuracy, which is the harmonic mean of two other metrics of the algorithm namely Precision and Recall. The F1 Score is given by:

$$F1 = 2 \times ((\text{Precision} \times \text{Recall}) / (\text{Precision} \times \text{Recall})),$$

where

Precision = True Positives / (True Positives + False Positives); and

Recall = True Positives / (True Positives + False Negatives).

In other words, Precision measures how well the machine learning model avoids assigning the wrong tags to a piece of intelligence data and Recall measures how well the machine learning model assigns tags correctly to a piece of intelligence data. As the tags may be used to ensure data security in the manner described herein, it will be appreciated that the more accurate the tagging produced by the machine learning algorithm, the more secure the data. Precision can be thought of as the fraction of acquired intelligence that are relevant to a particular query (in this case the criteria for capturing the intelligence in the first place) i.e., the number of correct results divided by the number of all returned results. Recall can be thought of as the fraction of the relevant intelligence that is successfully acquired from all the available intelligence (relevant and non-relevant intelligence) i.e., the number of correct results divided by the number of results that should have been returned.

The F1 Score is interpreted as the weighted average of Precision and Recall, with a highest possible value of 1 and lowest possible value of 0.

As discussed, keywords are the words in intelligence data that are to be classified as a label/tag. The distribution of keywords in an intelligence dataset is therefore unbalanced i.e., there is an uneven label distribution because not all intelligence data will have the same keywords. In order to account for this imbalance, a weighted F1 Score is preferably used which is the average F1 Score of each label/tag weighted by the number of true instances.

As mentioned above, the automatic tagging and reordering module 40 can also be configured to order the tags that have been applied to intelligence data by the machine learning algorithm. Thus, this process is carried out by the automatic tagging and reordering module 40 subsequent to the intelligence being automatically tagged. In general, a plurality of tags are associated with a piece of intelligence, but in some cases only one tag could be assigned to the intelligence. The order of the tags is important because the relative position of a particular tag, compared to the other tags associated with the same piece of intelligence, is taken into account when identifying the relevancy of the tagged intelligence prior to transfer of that intelligence from the central database to the end user's individual database. By relevant position, it is meant a position of a tag within a list of multiple tags associated with a piece of intelligence. A tag having a higher position is a tag that appears higher up a list (that is, closer to the top entry of the list) of tags, and vice versa. The tags are ordered, after classification, based on a set of rules or ordering criteria, which will be discussed later.

Once intelligence data has been tagged and is in the required order, the data is copied to the various individual databases of the end projects by the automatic data synchronisation module 60. In particular, the tagged intelligence data is copied to the individual database that is most relevant in order to generate insights and results which can be acted upon or implemented by the end user. Each client or end user has a separate database instance. Within each database instance the client will have at least one project which has its own individual database. Since intelligence data within the database is segregated at a project level via the tagging, intelligence data can be copied to multiple project databases if required. Automating this synchronisation, or copying, process is key since strategic decision making by the end user relies on the timely receipt of relevant intelligence to that end user. Manually scanning and copying of such data would delay the delivery of critical intelligence to the end user, having an inverse effect on critical decision-making and so an automated data synchronization process is critical to ensure that the most relevant intelligence is pushed to the end user database as soon as possible. In particular, as has been mentioned, the order in which the tags are linked, or assigned, to the intelligence plays a vital role in deciding which intelligence is the most relevant and gets pushed first.

As the data is copied to the various individual databases, it is marked with a unique identifier that is specific to a particular individual database. The identifier helps ensure that the tagged data remains in its relevant individual database, once it has been transferred, and cannot be accessed by another individual database. In addition, the unique identifier helps the overall system monitor whether the data is moved or copied elsewhere outside of the individual database to which it has been originally transferred according to the tags. The system can apply an alert mechanism if the data is moved/copied elsewhere where it does not belong.

Before the data tagging and synchronization system 100 can be implemented, the machine learning model must first be trained. This training is done by collating and preparing a training intelligence dataset. The overall training process can be thought of as comprising a number of sub-steps, or sub-processes, including training data collection, data pre-processing and data preparation, and data modelling. Each of these sub-processes will be discussed in more detail below.

In order to construct the training dataset, intelligence data from a number of sources is manually collected and tagged. As this step is done manually, and so is a relatively time-intensive step, the data volume is relatively low. This means that the overall F1 Score, which is the evaluation metric used to measure the accuracy of a particular machine learning model, will be relatively low at the beginning of the training process, indicating that in the initial stages the machine learning model will not be that accurate overall. It should be noted that whilst the F1 Score is considered low here, it is still sufficiently high that different machine learning models can be trained, evaluated, and compared with each other in order to determine the most suitable model.

To help train the machine learning model to predict which tags should be assigned to a piece of intelligence, at least one attribute associated with that piece of intelligence is identified. Generally, more than one attribute of particular interest will be identified for the intelligence data. However, only some of these identified attributes are used to train the machine learning (ML) model for tag prediction. The attributes that are used to train the ML model are generally attributes that will have an impact on data relevancy and the overall classification and tagging process. For example, in some cases, the attributes that are of particular interest in relation to tag predication include the title of the intelligence and the summary of the intelligence. Attributes that relate to data or numerical fields are generally not used to train the ML model and so these attributes of the intelligence data are ignored.

The attributes that are required to train the machine learning model in relation to which tag is most appropriate for intelligence data are extracted from the acquired data and cleaned, which is generally an automated process. As has been discussed previously, intelligence data typically comprises large strings including HTML characters, extra white spaces, non-alphabetic characters, stop words, etc. and so these are preferably cleaned from the extracted attributes using an attribute cleaning module configured to carry out an attribute cleaning process.

The attribute cleaning process can comprise any one or more of the following steps. The attribute cleaning process begins by combining the multiple attributes of interest into a single string. For example, the title of the intelligence and the summary of the intelligence are combined into a single string. If there is only one attribute of interest for the intelligence data, then this step is not relevant. Once the attributes have been formed into a single string, the single string is converted into lowercase text (where appropriate in relation to uppercase text) and unwanted noise is removed using a custom utility method as described in the following. Noise removal includes the removal of HTML tags, punctuation, and non-alphabetic characters. Finally, any stop words present in the single string are removed using a natural language processing program, for example the Python NLTK library. The language processing program includes a list of default stop words that are removed. However, additional stop words can be added to the stop word remove list if necessary, for example if requested by a particular end user. This final step completes the process of converting the training dataset into a structure data type comprising named data fields, which is then used to prepare a dataset for the training model.

The attribute cleaning module, which carries out the attribute cleaning process, can therefore be thought of as comprising a conversion module configured to carry out a first conversion process in which the input training dataset is converted into a structure. The attribute cleaning module therefore carries out the function of the previously described data cleaning module 42, and these two terms can be used interchangeably. The machine learning model requires numerical inputs and so the structure of the cleaned attributes, which comprises text, needs to be converted into numerical format, mostly commonly in the form of vectors. This step is carried out by the conversion module which is further configured to carry out a second conversion process in which the structured data type is converted into a vector data structure. The conversion module carries out the function of the previously described data conversion module 44 and these two terms can be used interchangeably.

This second conversion process begins by first identifying the most frequently occurring words in the structure. However, it is likely that some common but not useful words will occur frequently in nearly all intelligence data and so the unique appearance of words in each piece of intelligence is also measured. In this context non-useful words are irrelevant words that are not going to be used for tag classification. Thus, in order to increase the accuracy of tag classification, as well as considering the most frequent words, we also need to consider words having a unique appearance as well. This measuring is carried out on the pre-processed and cleaned dataset using the TF-IDF method, applied to the pre-processed and cleaned dataset, which represents how important a specific word is within a given piece of intelligence. The TF-IDF result, or score can then be used as a weighting factor during intelligence retrieval searches.

Using the TF-IDF method, a score is assigned to each word identified or present, regardless of how useful or non-useful it is, in the intelligence data based on how common that word is within a specific piece of intelligence and how uncommon it is across the full intelligence dataset. In other words, the TF-IDF process compares each word frequency within and across all intelligent documents. If a word appears multiple times within a document but does not appear at all in any other documents, then it a good candidate for tag classification for the document where it appeared multiple times or is common.

At this stage, words that are either very common or very rare are excluded from the remaining process to avoid skewing the TF-IDF results by taking into account essentially irrelevant words. This is achieved by assigning limits to word frequency, where an upper frequency limit is used to prevent words that are too common from being included and a lower frequency limit is used to prevent word that are too rare from being included in the TF-IDF matrix. The TF-IDF matrix is a matrix of TF-IDF scores for all the words present in the attribute and so each word in the attribute is represented by a number. This matrix is the input into the machine learning algorithm and the TF-IDF is calculated using the following formula:

$$W_{t,i} = TF_{t,i} \log \frac{N}{DF_t},$$

where:
$W_{t,i}$=the weight of term t in intelligence i;
$TF_{t,i}$=number of occurrences of term t in intelligence i;
$DF_{t,i}$=number of pieces of intelligence i containing the term t; and
N=total number of pieces of intelligence i in the dataset.

Finally, applying the TF-IDF matrix, i.e. converting the cleaned intelligence data structure into the TD-IDF matrix by converting words into numeric format, completes the data preparation for the machine learning modeling. The conversion module configured to carry out the second conversion process in which the text data structure is converted into a numerical vector format can therefore be thought of as being configured to convert a cleaned intelligence data structure into a numerical matrix, known as text vectorization.

In some embodiments a machine learning model is used to tag the intelligence data with biomedical tags. The ML model is developed to extract biomedical tags from the datum of interest. As such datum is textual in nature, the ML model is based on various Natural Language Processing (NLP) algorithms. The model is capable of being trained to identify different types of biomedical tags (which are also known as named entities in the NLP domain). It is possible for the ML model to be re-trained to identify different types of named entities.

Given the requirements of identifying biomedical tags from the data, the ML model is based on an ensemble of Named Entity Recognition (NER) models. Such NER models work by identifying named entities which they have been trained to recognize from input text, based on a corpus of named entities exposed to the model during training, and based on the language and grammatical context of the text being processed. Such models are different from rules-based software algorithms which don't take context and language semantics into account.

Figure 5:
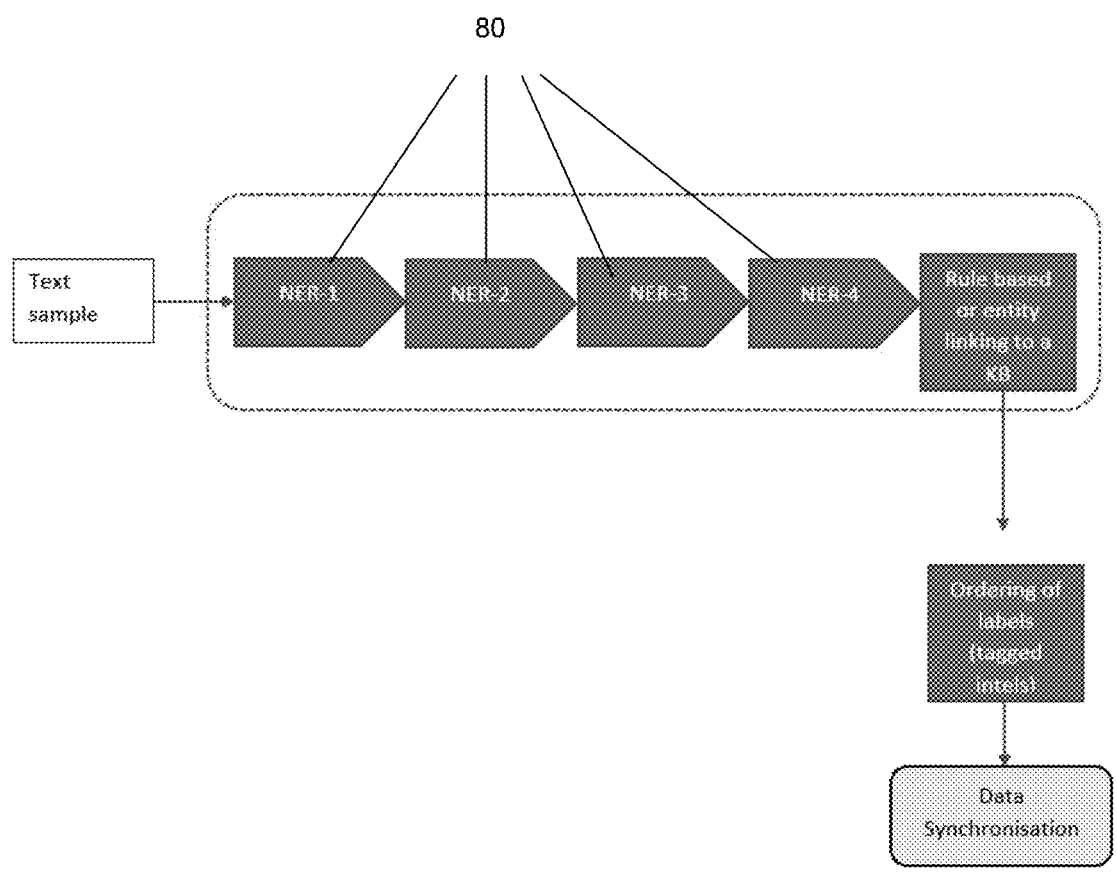
FIG. 5 is a schematic flow diagram of a machine learning model.

The ML model is an ensemble of NER models 80, each of which is designed to identify a certain type of biomedical tag. As an example, one of the models consists of a chain of NER models working to identify the therapeutic area, disease, biomedical products, biomedical chemicals, and the geography of operation from the input text, as shown in FIG. 5.

Figure 6:
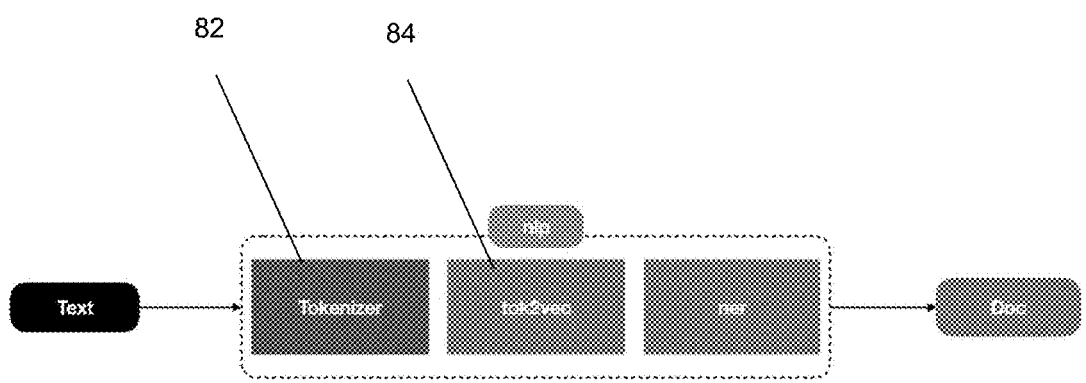
FIG. 6 is a schematic flow diagram of a machine learning model.

Each of the NER models can be individual designed to identify a certain type of biomedical named entity (tag). This process consists of preprocessing training data (to remove noise from the data and to convert it into a format which is understood by the NER model). A typical pipeline for an NER model is shown in FIG. 6. The tokenizer 82 is used to convert input text into unique tokens in a sentence, by taking into account the whitespace and punctuation in the input text.

The tok2vec layer 84 is a machine learning component that learns how to produce suitable (dynamic) vectors for tokens. It does this by looking at lexical attributes of the token, but may also include the static vectors of the token. This component is generally not used by itself, but is part of another component, such as an NER. It will be the first layer of the NER model, and it can be trained as part of training the NER, to produce vectors that are suitable for the NER task. In the model used for NER, the system uses a word embedding strategy, a deep convolutional neural network for context encoding, and a novel transition-based approach for named entity parsing.

The NER model is trained using a corpus of biomedical tags based on a proprietary set of disease names, product names, and chemical names. The training is performed on a set of intelligence data curated from various closed-source and open-source biomedical new articles. Expected biomedical tags may be referred to as true tags and the actually identified biomedical tags may be referred to as predicted tags.

The NER ensemble model performs well for identification of biomedical tags from the input text. As an example, for one of the models developed, the accuracy of biomedical tag identification had the following accuracy (based on testing the model on around 2500 previously unseen text data):
　Recall or sensitivity—0.9600
　Precision—0.9082
　F1 score—0.9326

Referring here to FIG. 1, once the chosen model has been trained S108, the model can be applied to real data S208. This process involves firstly capturing new, un-tagged intelligence data S202 which is then preferably cleaned S204 and prepared S206 for classification, and then run through the trained model to assign the tags S208. The assigned tags are then preferably re-ordered based on priority. This process will be described in more detail below.

As mentioned, the data acquisition module 20 monitors changes across a number of different sources which have been identified as relevant to at least one end user. The data acquisition module 20 captures intelligence data from the different sources based on relevant keywords S202. In particular, keyword-based change alerts are set by the end user for a particular project and so the keyword-based change alerts are project specific. Based on the alerts, the data acquisition module 20 looks for data changes relating to the alert keyword in the different sources and then captures the incremental change. Sources which can be used to collect intelligence data from include regulatory repositories, clinical trial repositories, publication databases, pharmaceutical jobs sites, and social media (e.g. Twitter, Facebook, Instagram, LinkedIn).

Each end user can set the frequency of the change alert, defining how often the data acquisition module 20 monitors and captures data changes, for example fetch data changes once a day or twice a day. After capturing the data, the system processes the captured data to turn it into the system's pre-defined format so that all data acquired from external sources is in the same format and can be converted into intelligence. Since each end user has different needs (for example different business goals or objectives) with regard to tracking developments within a particular field (for example tracking developments in the pharmaceutical field), intelligence that is relevant to one end user may not be relevant to another end user. Each end user is therefore able to define a list of keywords specific to each project which are stored in the individual project databases and accessed by the data acquisition system. This list of keywords forms the basis on which the different intelligence sources are monitored and intelligence data is captured for that particular end user. The frequency of data capture is determined based on an alert frequency set by the end user. For example, if there are 1000 alerts and each alert has a frequency of twice a day then system will execute all 1000 alerts twice in a day. The end user is able to modify their list of keywords as their objectives or priorities change over time. Common search tools can be implemented, for example Boolean search capability, in order to increase the relevancy of the acquired data and make monitoring more effective.

FIG. 2 illustrates the data acquisition process. A change alert module 22 within the data acquisition module 20 monitors S202 a plurality of different sources 10 and websites for changes and updates in the content and information available on those sources. Once a change on a particular source has been identified the change is captured, meaning that any newly added or altered information or data on a source is extracted from that source. Types of change that are monitored include alterations or updates to clinical or regulatory databases, publications, and social media websites. The changes are monitored and captured based on the list of keywords provided by the end user.

The change alert module 22 therefore allows users to set up at least one, and in many cases more than one, keyword-based change alert on various sources. The change alert module 22 captures and pushes the data relating to the change to the tagging and reordering module 40 responsible for transforming the raw data into structured intelligence.

Once these changes have been captured, the change alert module 22 sends S203 a notification to the end user to inform the user that new data has been extracted from a source.

Looking again at FIG. 2 an intelligence data preparation module 46, forming part of the data conversion module 44 within the tagging and reordering module 40, carries out the first part of the intelligence data preparation process S206 before the intelligence is stored S207 in the central database 12. In particular, the data cleaning module 42 receives the captured data from the change alert module 22 and processes S206 the captured data to transform it from unstructured intelligence to structured intelligence, as has been discussed previously. The data cleaning module 42 cleans the acquired raw intelligence data and transforms, or converts, cleaned intelligence data into structured intelligence. Once the cleaned intelligence data has been transformed, the structured intelligence is saved S208 to the central intelligence database 12.

In some cases, as shown in FIG. 2, further intelligence, which may be referred to as secondary intelligence data, can be manually captured S210 in addition to the automatically captured intelligence, which may be referred to as primary intelligence, and this gets stored in the central intelligence database.

The intelligence data preparation module 46 monitors the central intelligence database for new intelligence data, and any new intelligence data that has been identified is then pre-processed and converted into numerical vectors ready to be input into the trained machine learning model for classification and tagging. The pre-processing, preparation, and conversion steps are the same as those described previously with reference to the training dataset. The structured intelligence data is cleared of HTML tags, extra white spaces, and stop words. The TF-IDF matrix is then applied to the structured intelligence data to convert the text into numerical vectors, forming the input data for the machine learning algorithm. The input data for the machine learning algorithm can be referred to as prepared intelligence data.

The prepared intelligence data is then run through the trained machine learning model for tag classification. The intelligence data is, typically, classified with multiple tags and then the tagged intelligence is stored in a temporary in-memory storage to be processed further for tag re-ordering.

There is a central repository of tags 109 each tag having a priority assigned to it. The central tag repository is created from manually curated intelligence data 102 during the ML training process and forms part of the central database. The priorities are assigned based on the importance of the tag to the end user's particular project. As the projects change over time, the priorities of tags may also be changed over time. The priorities are then used to (re-)order the tags from the highest priority tag to the lowest priority tag, so that the highest priority tags appear first in the ordered list of tags. As will be appreciated, in some cases the tags could alternatively be ordered from lowest priority to highest priority.

In order for the tagging to be meaningful to the end user, in terms of aiding decision making or providing intelligence insights, the intelligence data cannot be classified or prioritised based only on natural language processing (NLP) or occurrence frequency. Instead, a set of rules or ordering criteria are defined based on what the end user intends to use the data for. The set of rules are the same for all the individual project databases, although these can be re-defined and changed over time as the projects change. For example, the rules may be defined based on business requirements. These rules are applied and are used to determine and set the priority of each tag, which ultimately determines the order of the tags. Thus, the tags can be thought of as being classified into a number of priority categories based on the set of rules. As an example, the following set of rules can be used to define the classified tag priority and tag order:

Tag identified as Key Topic—P1
Tag Identified as Therapeutic Area (TA)—P2
Tag identified as Product—P3
Tag identified as Disease/Disease Area (DA)—P4
Tag identified as Market/Location/Region—P5
Tag identified as Indication/Sub Type—P6
All other tags—P7 where P1 corresponds to the highest priority and P7 corresponds to the lowest priority. In this example, the classified tags could be: United States (identified as Location); Oncology (identified as TA); Prostate Cancer (identified as DA); Clinical/Clinical Data (identified as Key Topic). In this case, the tag order would be Clinical, Oncology, Prostate Cancer, United States, (having priorities P1, P2, P4, and P5 respectively). The tagged data is stored in the central database before it is synchronized with the individual project databases 69. The rules and tags applied to the data in the central database are common across all the databases in the system (i.e. across the central and project databases).

The tagged intelligence data is then copied to the individual end user databases by the data synchronization module 60. In particular, this module 60 automatically copies the most relevant data to each end user's database and so both accuracy and relevancy are important. As mentioned previously, as the data is copied to the individual end user databases, it is marked with unique identifier specific to an individual database. That is, each individual database has a unique identifier associated with it, and any date that is to be copied to a database is marked with the corresponding database identifier. The identifier will help ensure that tagged data remains in the correct individual database as well as helping the overall system monitor whether the data is moved or copied elsewhere outside of its database.

Figure 3:
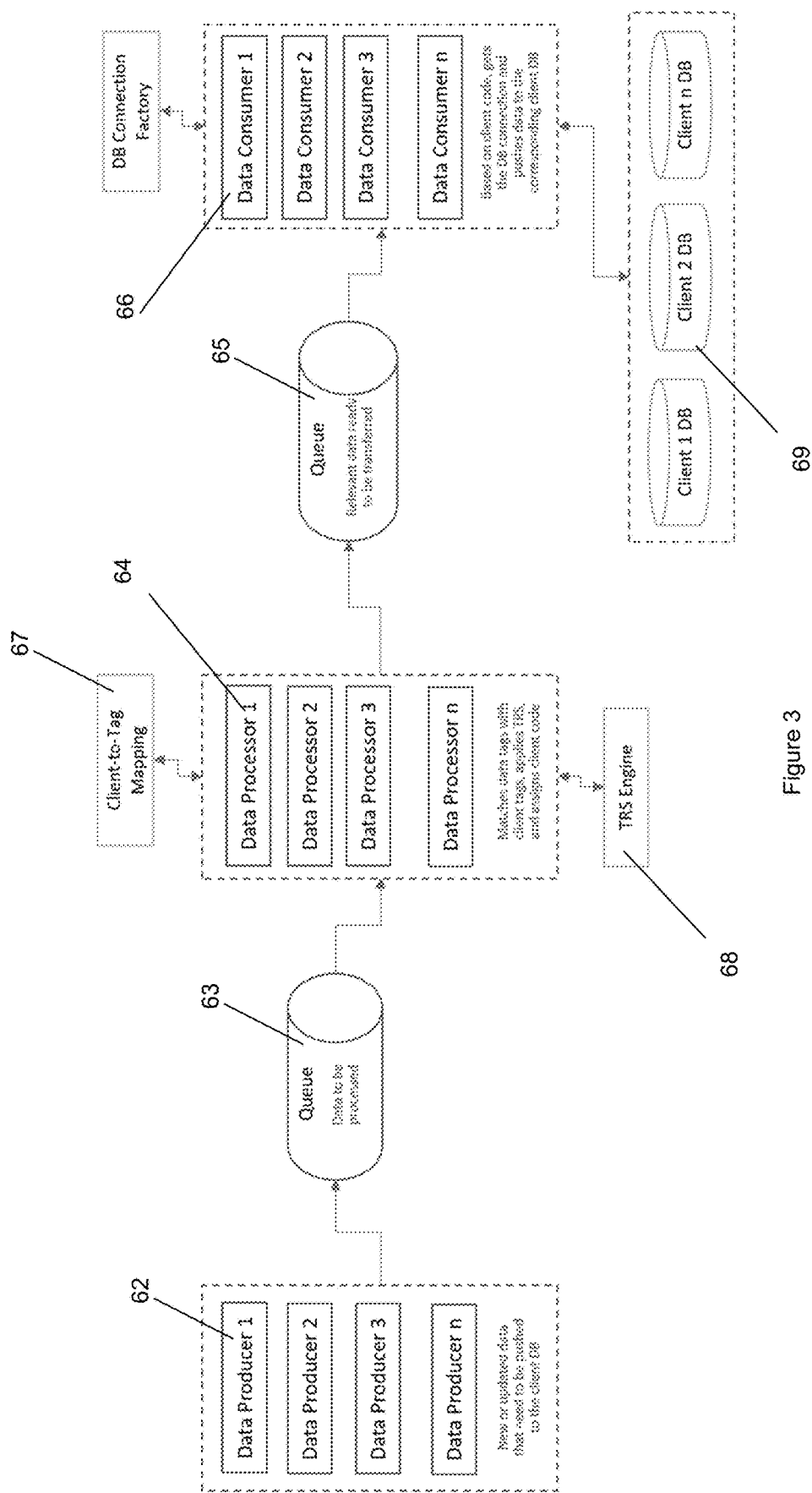
FIG. 3 is a schematic flow diagram of a data synchronisation system.

With reference to FIG. 3, once the data classified with tags are in their proper order based on the priorities, the tagged and ordered data needs to be pushed S212 to the correct individual databases where the data are relevant. Generally, a large volume of data will need to be processed at this stage and so parallel processing with a queue-based approach is implemented to maximize the utilization of computing resources.

Any stream processing programme, for example, Apache Kafka, can be used as the message broker to queue up data within various topics. A publish-subscribe messaging pattern is used to publish data for processing. A topic acts as a queue, and a publisher component can publish or push a dataset to a topic and then that topic pushes the dataset to a subscriber component of that topic for further processing, and so any message published to a topic is immediately received by all subscribers of that particular topic. Topics will be created to handle specific data, for example, Intelligence Topic for intelligence data processing, KIQ Topic for KIQ data processing.

A data producer module 62, within the data synchronisation module 60, is configured to publish the automatically classified data to the relevant topic. In the case of intelligence, after the intelligence data has been automatically tagged, the tagged intelligence will be published to the Intelligence Topic for data transfer. Different data producer modules are used to handle different types of data.

In brokered messaging, a queue is the broker that retains a message created by the data producer module 62 to be retrieved and processed by a consumer module 66. Two messaging queues are implemented, a first messaging queue 63 to hold new or updated data as soon as the data are stored in the central database, and a second messaging queue 65 to hold the processed data i.e., data that are ready, with the required attributes, to be transferred to the end user databases. Attributes associated with the processed data include a client code indicating the relevant project database to which the data should be copied and a client project database tag relevancy score, which will be discussed below.

As shown in FIG. 3, the data producer module 62 sends data S310 to the first message queue 63 and a data processor module 64, within the data synchronisation module 60, receives the data from the first queue 63 and gets the data ready to be transferred S308, illustrated in FIG. 1. The data processor 64 will subscribe to the relevant topic of the messaging queue. A piece of data is ready to be transferred when the data is marked with a code representing the desired end user database to which the data is to be transferred, after taking into account the tag relevancy score and the client tag mapping, which will be discussed in more detail below.

The client code performs the function of the previously mentioned unique database identifier, and so these terms can be used interchangeably. The client code, which is associated with a particular individual database, therefore helps ensure that, once the tagged data has been copied based on the tag, the data is not accessible through another database and cannot be transferred to another database. The client code therefore helps protecting the contents of the individual databases from being accessed by non-authorised users, improving the security of the individual databases.

Client-to-Tag mapping 67 is created at the time of the individual database set-up and is subsequently updated by the system as and when tagged data is copied to the individual project database. This ensures that the overall system maintains client-to-tag mapping, which is used to calculate the tag relevancy score (TRS).

The TRS is a numerical value which indicates how relevant a piece of data is to an end user, in order to decide whether that piece of data should be transferred to the end user's database. The TRS ensures that the most relevant data are pushed to the end user's database first and are visible to the end user in their database in order of priority. The TRS can be calculated using the following rules:

Rule 1: Number of matching tags between data tags and client-to-tag mapping, called the tag match score (TMS) of the data for the client:

| # of Matches | Score |
|---|---|
| All | 100 |
| ≥4 | 80 |
| =3 | 60 |
| =2 | 50 |

Rule 2: Order or priority of data tag matches with the client-to-tag mapping, called the order match score (OMS) of the data for the client:

| Order Match | Score |
|---|---|
| 1st order | 100 |
| 2nd order | 80 |
| 3rd order | 60 |
| 4th order onwards | 50 |

Using the above rules, the TRS is calculated using the following formula:

$$TRS_d = TMS_{d,c} + \sum OMS_{d,c},$$

where $TRS_d$ is the TRS of data d, $TMS_{d,c}$ is the TMS of data d for client c (also known as the end user), and $OMS_{d,c}$ is the OMS of data d for client c. The calculation is carried out by a TRS engine 68, forming part of the data synchronisation module 60. The TRS result is then sent from the TRS engine 68 to the data processor, which attaches the TRS to the relevant intelligence data.

Once the relevant data is queued up ready for transfer S306, to form a processed data queue which is the second messaging queue 65, the data consumer module 66 consumes the data from the processed data queue and transfers the data S304 to the individual databases 69. In some cases, the data may be transferred to a single database but in other cases the same data may be transferred to more than one end user database. Multiple data consumer modules are used so that each data consumer module 66 can subscribe to different topics based on the type of data being handled for the transfer. The data consumer module 66 looks for the user or client code that has been attached to the data by the data processor module 64 and makes the transfer to the individual database 69. This completes the process of synchronizing the tagged intelligence in the central database with the individual project databases.

Figure 7:
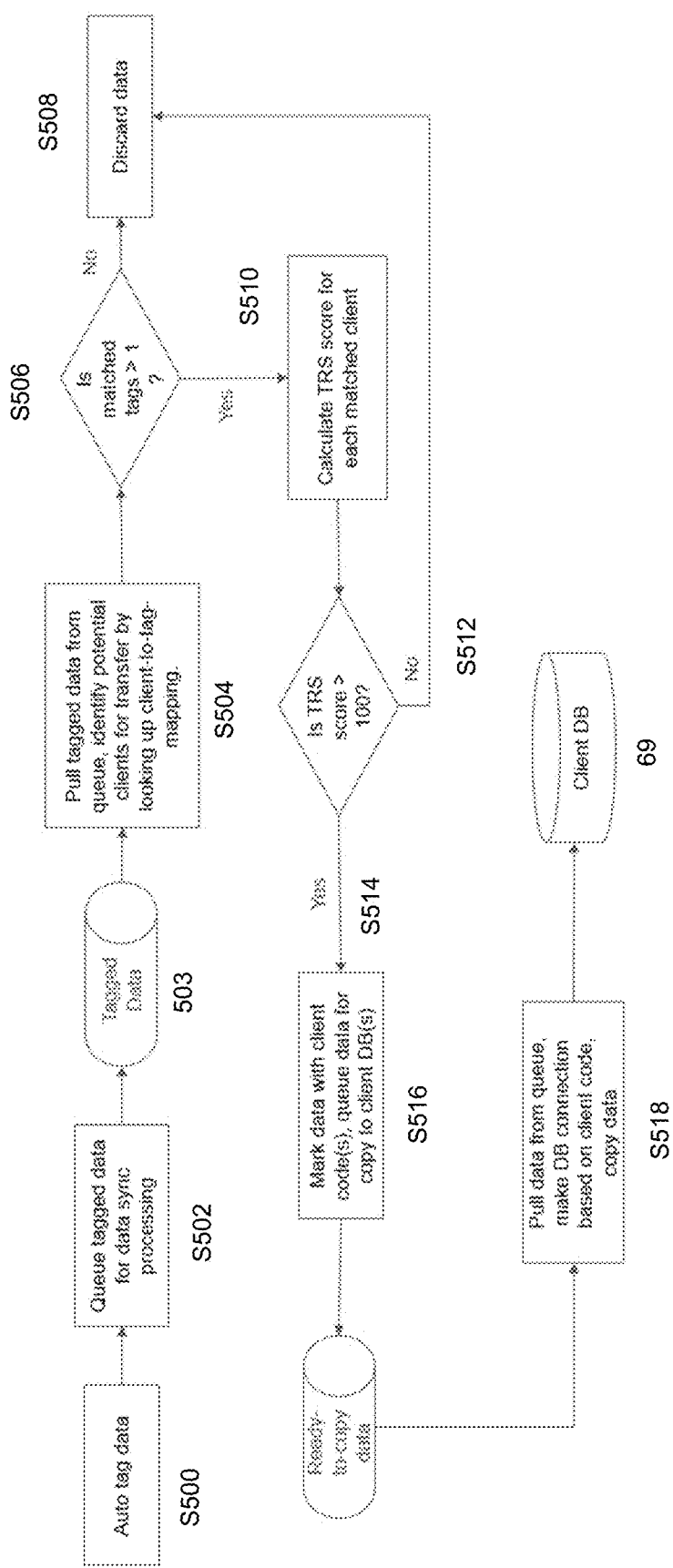
FIG. 7 is a schematic flow diagram of a data synchronisation system.

FIG. 7 illustrates an exemplary workflow of a data synchronization process that illustrates an exemplary process by which a machine learning model is used to tag the intelligence data with biomedical tags. Similarly, to the processes described previously, once the data has been tagged S500 the tagged data is queued S502 for data synchronization. When the tagged data is ready to be processed further, it is pulled (S504) from the queue 503 and the relevant client associated with this data is then identified using client-to-tag mapping as has been described previously.

Firstly, the number of matching tags between the data biomedical tags and the client-to-tag mapping is identified S506. If the number of matching tags is less than 1 then the data is discarded S508 as not being relevant to a particular client. If the number of matches is greater than 1 then the TRS score of the data for the client is calculated S510, in the same manner as described previously. If the TRS score is less than 100 then the tagged data is discarded is not relevant to the particular client. If the TRS score is greater than, or in some cases greater than or equal to, 100 then the tagged data is marked with a client database code S516, the code being uniquely associated with a particular client database. This marked and tagged data is then queued for transferring to the client database.

Once the data is ready for transferring, it is pulled from the queue S518, a connection to the relevant client database is made wherein the relevant client database is identified using the client code, and the data is then transferred to the client database 69.

Thus, as will be appreciated, these processes described with reference to FIG. 7 are similar to processes described with reference to FIG. 1 (in particular those identified by reference numerals S212, S310, S308, S306, and S304 in FIG. 1). As such, a similar framework and similar modules can be used to implement the process in FIG. 7 as are used to implement the processes of FIG. 1.

Figure 8:
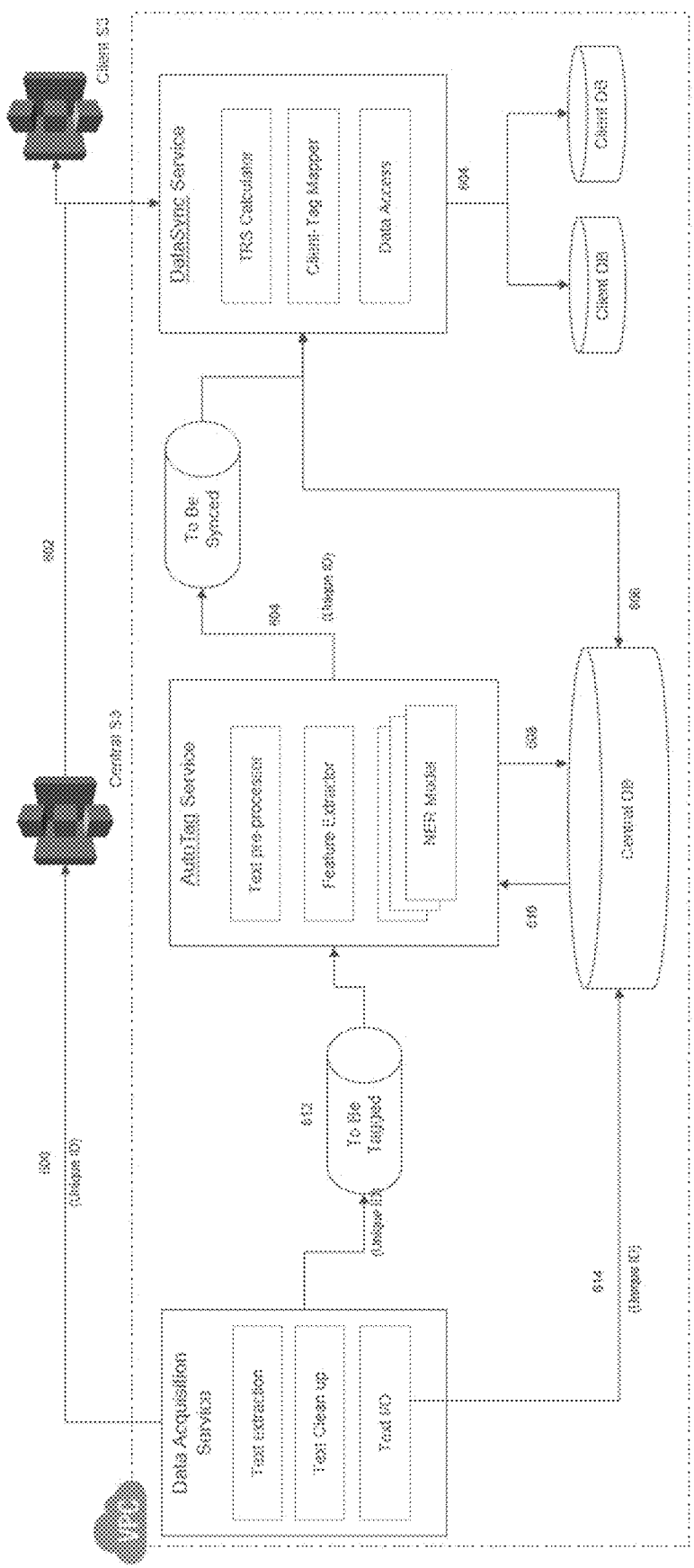
FIG. 8 is a block diagram of an AI framework.

FIG. 8 illustrates another exemplary architecture which may be used to implement the automatic data tagging and synchronization processes previously described. For example, the architecture in FIG. 8 may be used to implement the processes describe with reference to FIG. 7.

Briefly, and referring to FIG. 8, there is a central repository which stores physical supporting documents (for example having format including .docx, pptx, pdf, images, etc). These supporting documents are associated with the intelligence data as supporting evidence but in some cases the intelligence data itself is a supporting document. There is also a client repository which stores intelligence supporting documents specific to each client once tagged intelligence data is copied to the client database.

A Data Acquisition service (DA) is responsible for acquiring data from public sources, and functions in a substantially similar manner to the previously described data acquisition module 20. An Auto Tag Service (AT) is responsible for applying an AI model for auto tagging of intelligence data, and functions in a substantially similar manner to the previously described tagging and reordering module 40. A Data Sync Service (DS) is responsible for copying relevant tagged intelligence data from the central database to the client database(s), and functions in substantially the same manner as the previously described data synchronisation module 60.

The DA, AT, and DS are preferably hosted on a virtual private cloud (VPC). The architecture is cloud agnostic in that it can be deployed in public as well as private data centres.

The central database illustrated in FIG. 8 is used for storing acquired data after it has been cleaned, storing tags (including biomedical tags) once the cleaned data has been processed for auto tagging, and storing meta-data for further processing.

A typical data flow between the DA, AT, and DS may include the following processes. Once data has been acquired and cleaned by the DA service, one or more of the following three actions take place. A first action includes copying the cleaned data (and in some cases the metadata) to the central database 614. A second action includes uploading supporting documents to the central repository 600. Supporting documents may also be uploaded to the client repository 602. A third action includes publishing a message to a queue for the AT service for subsequent processing 612. While the actions have been described with reference to the terms first, second, and third, it should be noted that these are merely labels to identify the different actions from each other and they do not necessary indicate the order in which the actions are performed. For example, the second action may take place before or at the same time as the first action.

Once the data is ready to be tagged the AT reads the intelligence data for auto tagging from central database 610 (where it has been saved by the DA). After the data has been tagged, the tags are saved in the central database as metadata against the intelligence data in central database itself 608. A message is then published to queue the tagged data for data synchronisation by the DS 604. The DS then transfers the tagged intelligence data to the relevant client database 604. Tagged intelligence data can be read from the central database for processing; for example, updating the data synchronisation status in the central database once the tagged data has been copied to the client database 606.

It will be apparent to a skilled person that the present teaching can be implemented by one or more processors executing computer-readable instructions stored on a storage medium. Any of the steps described above can thus be implemented by one or more computers. Program code that causes any one or more of the steps of the present teaching to be carried out can also be provided.

The invention claimed is:

1. A computer-implemented method of synchronising data between a central database and at least one individual database, comprising instructions stored on non-transitory computer-readable media which, when executed by a computer system, carry out the following:
   acquiring biomedical data from at least one external source;
   forming an intelligence dataset, the intelligence dataset comprising multiple intelligence data;
   storing the intelligence dataset in a central database;
   applying a machine learning (ML) tagging algorithm using an ensemble of Named Entity Recognition models to the stored dataset to assign at least one biomedical tag to each intelligence datum in the stored dataset;
   forming a tagged intelligence dataset including multiple biomedical tagged intelligence data; and
   copying each biomedical tagged intelligence datum from the central database to at least one individual database that is relevant to the biomedical tagged intelligence datum based on the assigned biomedical tag such that acquired biomedical data is only copied to the at least one individual database that is relevant to the assigned biomedical tags,
   wherein a plurality of biomedical tags is assigned to at least one intelligence datum, and
   wherein the at least one at least one intelligence datum having a plurality of biomedical tags assigned thereto is copied to a plurality of individual databases based on the assigned plurality of biomedical tags.

2. The method of claim 1, wherein the acquiring comprises:
   monitoring the at least one external source for a change in source data; and
   if a change is detected, acquiring the source data related to the change.

3. The method of claim 2, wherein the monitoring comprises checking for a change in source data based on information contained within a change alert.

4. The method of claim 3, wherein the information contained with the change alert includes at least one of:
   information related to the frequency of monitoring the external source; or
   information related to a keyword to appear in the change in source data.

5. The method of claim 1 wherein, before applying the ML algorithm, the method further comprises preparing the stored intelligence dataset in order to convert the stored intelligence dataset from raw source data to input data to be input into the ML algorithm.

6. The method of claim 5, wherein the preparing comprises:
cleaning the raw source data to produce cleaned source data; and
converting the cleaned source data into numerical input data.

7. The method of claim 1, wherein the at least one biomedical tag corresponds to at least one individual database.

8. The method of claim 1, wherein the applying step comprises assigning one or more biomedical tags to each intelligence datum in the stored dataset.

9. The method of claim 8, wherein the one or more biomedical tags are obtained from a pre-defined set of biomedical tags to be assigned to the intelligence data.

10. The method of claim 8, wherein:
a plurality of biomedical tags is assigned to each intelligence datum; and
the method further includes ordering the plurality of biomedical tags assigned to each intelligence datum.

11. The method of claim 10, wherein the ordering comprises:
assigning a priority to each of the plurality of biomedical tags; and
ordering the plurality of biomedical tags based on the assigned priority.

12. The method of claim 11 wherein:
the assigned priorities comprise high priority tags and low priority tags; and
the ordering includes ordering the biomedical tags from highest priority to lowest priority.

13. The method of claim 1, wherein the at least one individual database can only be accessed by one or more end users that have been assigned to the at least one database and have been granted access to the at least one individual database.

14. A system for synchronising data, comprising:
a central database;
at least one individual database; and
a computer system executing instructions stored on non-transitory computer readable media for carrying out the following:
acquiring biomedical data from at least one external source;
forming an intelligence dataset, the intelligence dataset comprising multiple intelligence data;
storing the intelligence dataset in a central database;
applying a machine learning (ML) tagging algorithm using an ensemble of Named Entity Recognition models to the stored dataset to assign at least one biomedical tag to each intelligence datum in the stored dataset;
forming a tagged intelligence dataset including multiple biomedical tagged intelligence data; and
copying each biomedical tagged intelligence datum from the central database to at least one individual database that is relevant to the biomedical tagged intelligence datum based on the assigned biomedical tag such that acquired biomedical data is only copied to the at least one individual database that is relevant to the assigned biomedical tags,
wherein a plurality of biomedical tags is assigned to at least one intelligence datum, and
wherein the at least one at least one intelligence datum having a plurality of biomedical tags assigned thereto is copied to a plurality of individual databases based on the assigned plurality of biomedical tags.

15. The system of claim 14, wherein the acquiring comprises:
monitoring the at least one external source for a change in source data; and
if a change is detected, acquiring the source data related to the change.

16. The system of claim 15, wherein the monitoring comprises checking for a change in source data based on information contained within a change alert.

17. The system of claim 16, wherein the information contained with the change alert includes at least one of:
information related to the frequency of monitoring the external source; or
information related to a keyword to appear in the change in source data.

18. The system of claim 14, wherein the instructions further comprise, before applying the ML algorithm, preparing the stored intelligence dataset to convert the stored intelligence dataset from raw source data to input data to be input into the ML algorithm.

19. The system of claim 18, wherein the preparing comprises:
cleaning the raw source data to produce cleaned source data; and
converting the cleaned source data into numerical input data.

20. The system of claim 14, wherein the at least one biomedical tag corresponds to at least one individual database.

* * * * *